Aug. 16, 1932.  W. J. REHRIG  1,871,823
METHOD OF AND MEANS FOR SLOTTING GARMENT HANGERS
Filed Aug. 22, 1930  6 Sheets-Sheet 1

Inventor:
William J. Rehrig
by: [signature]
Attorney.

Aug. 16, 1932.  W. J. REHRIG  1,871,823
METHOD OF AND MEANS FOR SLOTTING GARMENT HANGERS
Filed Aug. 22, 1930  6 Sheets-Sheet 5

Inventor:
William J. Rehrig,
by: Attorney.

Patented Aug. 16, 1932

1,871,823

UNITED STATES PATENT OFFICE

WILLIAM J. REHRIG, OF LOS ANGELES, CALIFORNIA, ASSIGNOR TO STA-ON GARMENT HANGER COMPANY, A CORPORATION OF CALIFORNIA

METHOD OF AND MEANS FOR SLOTTING GARMENT HANGERS

Application filed August 22, 1930. Serial No. 476,997.

It has been found desirable to construct garment hangers with key slots across their upper edges and near their ends, said slots being adapted to hold the shoulder bands of ladies' garments and the belts or straps of men's trousers without slipping, whereby the shape of the article so held is most effectively preserved. I have found that slots suitable for this purpose can be produced economically and automatically by a properly constructed machine in which the slot is first cut in the garment hanger blank to the desired depth and of uniform width and next the sides of said slot are undercut to produce a pair of shoulders. By this method of producing key slots the loss caused by breakage of hangers during manufacture is reduced to a minimum.

The primary object of my invention, therefore is the production of an improved method and machine by which garment hangers are slotted in an efficient and effective manner and with a minimum of loss from breakage. Further an object is greater speed in production, less expense and hand labor during manufacture and the production of a higher grade article.

Briefly, my improved machine as illustrated in Figs. 3 to 18 of the drawings, by which my improved method may be carried into use employs two pairs of cutting elements, one cutter of each pair being adapted to cut a wide kerf of uniform width in and across the rims of a row of hanger blanks and the other to under-cut the sides at the root of said kerf and form key slots. These cutters produce two key slots simultaneously in a plurality of hangers which quickens manufacture and reduces cost of production. In said machine, a row of garment hangers to be slotted is presented to the cutting action of the cutters from an assembling table. After the cutting operation the hangers are delivered from the machine in an orderly manner so that they can be handled efficiently by an operator or removed by a carrier.

In the accompanying drawings forming part of this specification.

In the drawings, A indicates a garment hanger blank made out of wood or any other suitable material and provided with key slots 25 in its rim 26 near its opposite ends and of the kind which my invention is adapted to produce. My improved slot cutting machine as shown in Figs. 3 to 18 has a suitable frame B, which may be of any suitable construction desired to accommodate the various elements constituting the machine. The form shown is of rectangular skeleton construction. The garment hanger blanks A are received into the receiving end C, from a table 27, and delivered after being slotted upon a delivery table 28 at its delivery end D. In the median portion of the frame towards the receiving end is arranged a pair of individual motor driven cutters E—E, which are arranged to cut the transverse kerfs 29 in the opposite end portions across the rims 26 of the garment hanger blanks A, and a pair of individual motor driven revoluble cutters F—F, which are arranged to under-cut the sides of said transverse kerfs to produce key slots as said blanks are moved through the machine.

The frame B is provided with a pair of parallel longitudinal and rigid shafts 30—30, constituting guides, extending the full length of the machine, upon which is slidably hung a carriage G, said carriage being made to reciprocate from the receiving end to the delivery end and return automatically during each cycle of operation. This carriage is adapted to receive the garment hanger blanks with their convex rims down at the receiving end of the machine and presents the blanks to the action of the cutters, to cut slots in their rims after which it releases the blanks onto the delivery table with their ends resting on the side guides 31'—31 while the rims remain down and returns to the receiving end automatically to receive another load of blanks. Below the carriage G, when the latter is at the receiving end of the machine is an elevator H, whose function is to receive a row of blanks A from the longitudinal table, assembled transversely with their rims 26 directed down, and lift said row of blanks into engagement with the carriage, after which it is adapted to return to normal starting position.

Figure 5:
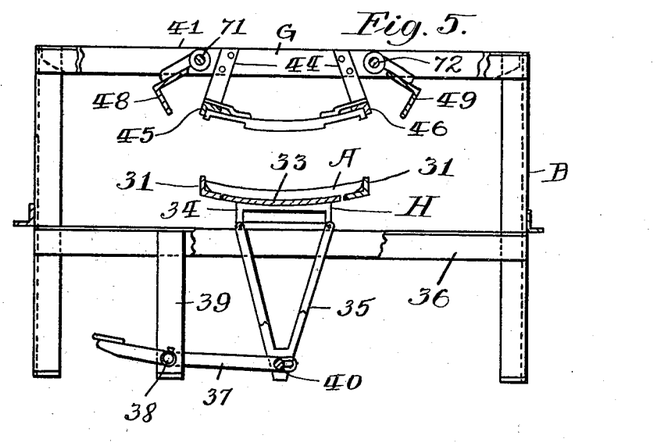
Fig. 5 is an end elevation partly in section taken on the line 5—5 of Fig. 3, parts thereof being broken away, including the driving gear, showing the position the parts assume immediately before the elevator is raised to deliver garment hangers to the carriage.
Figure 6:
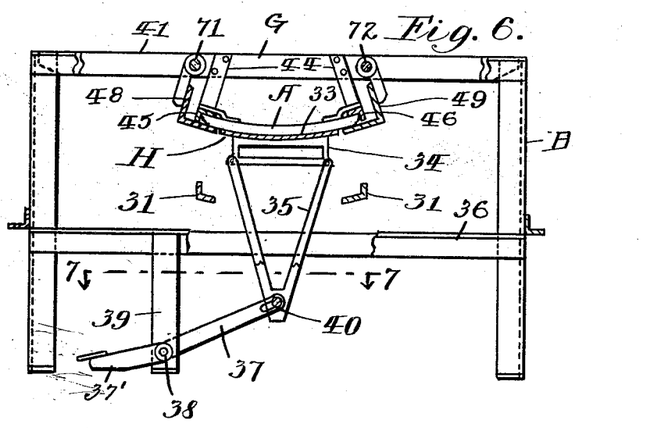
Fig. 6 is a view similar to that shown in Fig. 5, showing the parts immediately after the elevator has been raised and the garment hangers engaged by the carriage.
Figure 7:
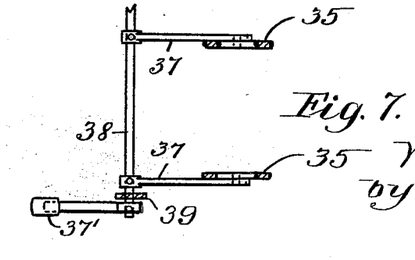
Fig. 7 is a section taken on the line 7—7 of Fig. 6.
Figure 8:
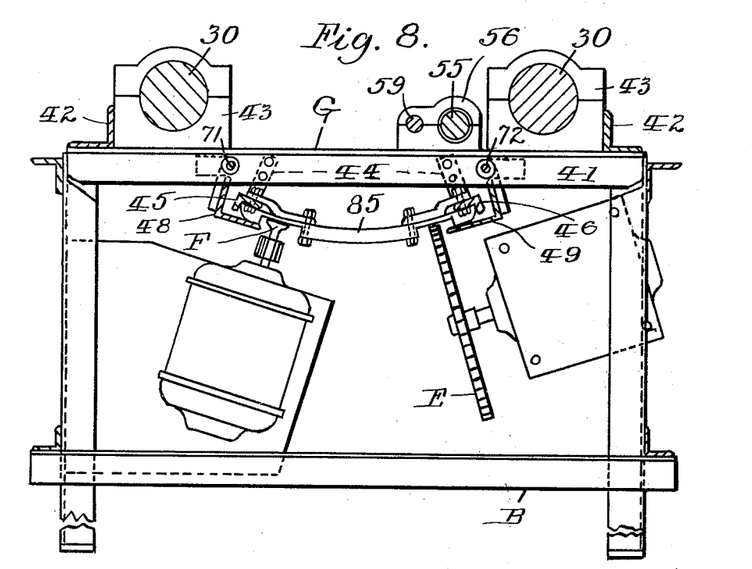
Fig. 8 is an enlarged section taken on the line 8—8 of Fig. 3, showing the cutters in the act of cutting slots in the garment hanger blanks, the carriage being shown after it has made part of its forward stroke.
Figure 9:
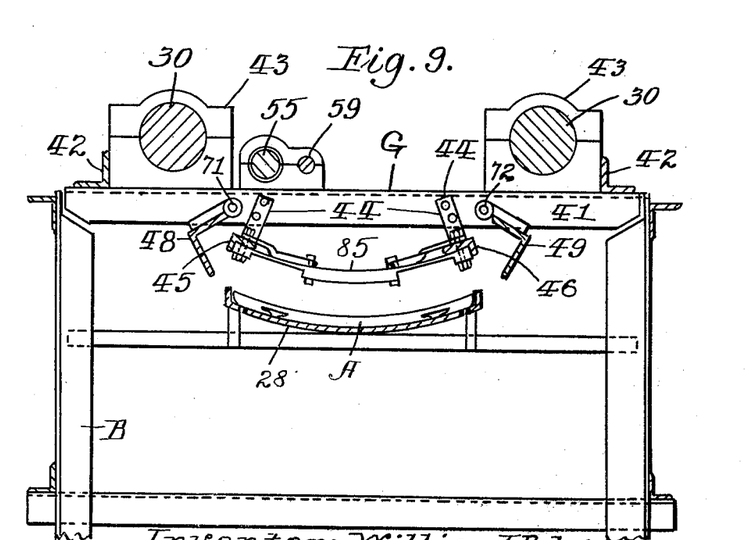
Fig. 9 is another enlarged section taken on the line 9—9 of Fig. 3, showing the position the parts assume immediately upon the carriage reaching the outer end of its feeding stroke and after the holders have released the garment hanger blanks from the carriage onto the delivery table.
Figure 10:
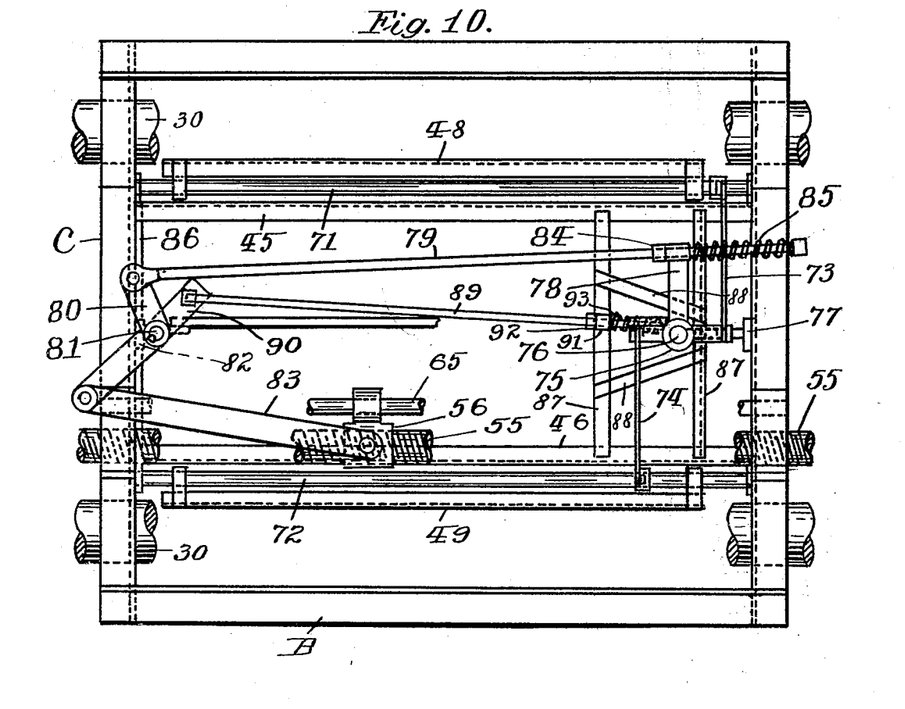
Fig. 10 is an enlarged plan of a detail showing a portion of the carriage clamping mechanism by which the side clamps are operated after the carriage receives its load of blanks in readiness to present the blanks to the cutters.

The horizontal receiving table 27 has a pair of longitudinal and parallel angle tracks 31 and a downwardly and inwardly curved pan 32, secured rigidly to and supported by the frame B, and upon which the garment hanger blanks to be slotted are assembled transversely in a row with their convex rims 26 directed down and their ends supported by tracks 31 to guide the row of blanks longitudinally into the machine. The tracks 31 extend inwardly completely below the carriage G while the pan 32 terminates before extending below the carriage the pan being used only to assist in assembling the garment hanger blanks on the tracks and before they are pushed by the operator along the tracks into a position over the elevator H. The elevator H has a narrow longitudinal downwardly curved pan 33, which normally rests freely between the rods 31 below the carriage. This pan 33 is supported by a pair of transverse skeleton cleats 34, which in turn are rigidly secured to supports 35. Said supports 35 are guided to slide the elevator vertically by the main frame B, the latter being provided with suitable cross members 36 to accomplish this result and to support the pan in horizontal position as shown in Fig. 5. Arms 37, fulcrumed at 38 on a depending bracket 39 from one of the members 36 are freely connected at 40 to the supports 35 and operated by foot lever 37' so that the pan 33 can be raised from the position shown in Fig. 5 and lowered from the position shown in Fig. 6 by depressing and releasing the foot lever.

The body frame of the carriage G has a pair of transverse members 41 secured to a pair of longitudinal members 42, said structure being provided with four sliding journal guides 43 which embrace and slidably hold the carriage in the pair of rigid guide shafts 30—30. Supported by the carriage on suitably dependent supports 44 are a pair of rigidly held longitudinal angle receiving members 45 and 46, the sides of each member being directed downwardly directly above and corresponding with tracks 31. Thus the elevator will lift the garment hanger blanks from the receiving table and place them with their ends between and within said receiving members 45 and 46. While being held raised in this position by depressing the foot lever 37', a handle 62 is operated to start the carriage on its cycle of operation as will be more fully described, and the first action is to close a pair of side clamps shown in Fig. 6, whereupon the row or load of blanks A is secured upon the carriage and the elevator can be lowered by releasing the lever 37' into the position shown in Fig. 5 in readiness to receive another load of blanks. The inner ends of the guides 31 are formed with fixed stops 50 (see Fig. 13) to limit the inward movement of the row of blanks and place them in juxtaposition above the elevator H. The hanger blanks A are assembled in a row transversely on the tracks 31 of the receiving table 27 (see Fig. 12) against movable gauge pins 51. These gauge pins 51 are withdrawn from the path of the assembled blanks by depressing a hand lever 52 with which said gauge pins 51 are pivotally connected. A spring 53 tends to hold said gauge pins 51 in obstructing position. Thus after a load of blanks has been assembled on the receiving table and the elevator is in normal position as shown in Fig. 5, the hand lever 52 is depressed, thus withdrawing the gauge pins 51 and said load is slid by hand along the tracks 31 over the elevator H until striking stops 50. The gauge pins 51 are then released. The elevator is then operated to raise the load of blanks into engagement with the carriage G by depressing foot lever 37'.

The carriage G is reciprocated forwardly and backwardly in the machine by a threaded shaft 55, (see Figs. 3 and 8) which carries a threaded follower 56, said shaft being revolved first in a clockwise direction to move the follower and carriage forwardly and then reversed in a contraclockwise direction to return the follower and carriage back into starting position. This change in action is produced automatically by a clutch 57 of any usual construction feathered to shaft 55 and adapted in one position to engage a driven clutch member 58 which is feathered to shaft 56 and revolved by belt 59 and in reverse direction by a driven clutch member 60 which is revolved by a belt 61.

When starting the machine a shift rod 62 within reach of the operator standing at the receiving end of the machine is pulled and being slidably mounted in the frame and coupled to a swinging lever 63, fulcrumed at 64 on said frame throws the clutch member 57 from neutral position into engagement with clutch member 58. The carriage has a longitudinal drive shaft 65 secured by its ends to the carriage and extending parallel with and in proximity to the drive shaft 55. Upon this carrier rod are two lugs 66 and 66', between which the threaded follower 56 is positioned so as to engage and drive the carriage forwardly and backwardly. The interval between the lugs 66 and 66' permits the clamping mechanism to hold and release the hanger blanks as will hereinafter be described. When the carriage reaches the delivery end of the machine, the follower 67 on the carriage and freely encircling the shift rod 62, strikes a lug 68 on said rod thus causing the clutch member 57 to reverse and engage driven clutch member 60, thus causing the shaft 55 to revolve in reverse direction and return the carriage from the delivery end to the receiving end of the machine. Upon reaching the receiving end the follower 67 strikes a lug 69 on the shift 62 and throws the clutch member 57 into neutral position, thus stopping the carriage and its drive shaft. A spring 70 on the shaft 62 resting against the lug 68 is for the purpose of causing a complete reversal of the clutch as otherwise the member 57 would only shift into neutral position when the carriage approaches the delivery end of the machine.

The cutters are arranged in pairs, the first pair carrying plain cutters resembling saws arranged and adapted to cut a pair of wide kerfs (see Fig. 2) to suitable depth across the upper edges or rims of the opposite ends of the row of garment hanger blanks on the carriage. The second pair of cutters carry rotary cutting tools which follow in the path of the first pair in undercutting the sides of the kerfs produced by the first pair and completes the key slots in the row of blanks on the carriage. The cutters are individually motor driven and are suitably mounted in fixed position on the frame of the structure, in the path of the row of blanks on the carriage, the axes of the first cutters being transverse to the rims of the garment hanger blanks and the axes of the second cutters being at right angles thereto for the reason of undercutting.

The clamping mechanism and its actuating members cooperate with the carriage to first clamp the garment hanger blanks upwardly against the carriage members 45 and 46 when the shaft 55 is first started and during the interval between the lugs 66 and 66', in which position the clamps hold the blanks on the carriage until the carriage reaches the delivery end of the machine, whereupon the clamps are released automatically to drop the slotted garment hangers upon the delivery table 28 and remain in released position until returned to the receiving end of the machine and a new cycle of operation is started. The side clamps 48 and 49 resemble angle irons with their lower sides turned inwardly toward each other and extending longitudinally along the sides of members 45 and 46. These clamps are secured to shafts 71 and 72 which in turn are journaled in the framework of the carriage. These shafts are connected by links 73 and 74 to the opposed arms of a shift lever 75, which is secured by a pivot 76 on a bracket 77 carried by the carriage. A member 78 of the shift lever 75 is employed to swing said lever on its pivot and thus tilt the side clamps 48 and 49 into engaging or releasing positions. This operation, which is automatic is accomplished by the use of suitable link couplings with the follower 56, said coupling consisting of a shift rod 79, a bell crank 80 keyed at its angle to a vertical rotatable shaft 81, extending down and journaled in a bracket 82 on the carriage frame, and a link 83, said shift rod being coupled to the outer end of one member of the bell crank and said link being connected to the other member of the bell crank and said follower 56. The shift rod has a stop 84 on one side of the member 78 and a compression spring 85 held against the other side of said member 78. As the follower commences to travel on the threaded shaft 55 towards the delivery end of the machine, the clamps are moved under yielding tension of spring 85 into clamping position, where they are held until the follower is reversed by the reversal of the clutch, whereupon the spring tension is relieved and the stop 84 positively causing the clamps to open. The opening movement occurs while the follower travels from stop 66' to stop 66. The members 48 and 49 constitute the lateral clamps for holding the ends of the garment hanger blanks tightly engaged upon the carriage members 45 and 46.

Figure 11:
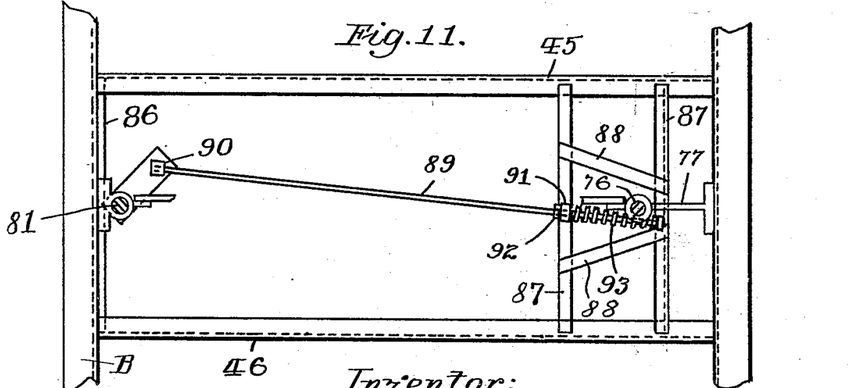
Fig. 11 is another plan of a detail similar to that shown in Fig. 10, showing a portion of the clamping mechanism by which the garment hanger blanks are secured longitudinally on the carriage, the parts being in position before the clamps are closed when the carriage is in readiness to receive a load of blanks and part of the side clamping mechanism being broken away.
Figure 12:
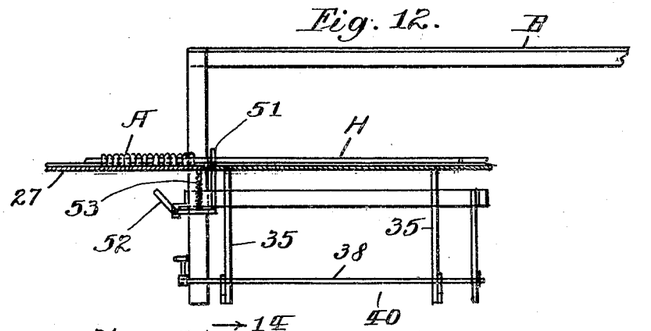
Fig. 12 is a central longitudinal section on line 12—12 of Fig. 3, showing the normal position of the elevator as it is about to receive a load of garment hanger blanks from the receiving table to be delivered to the carriage, part of the overhead structure above the carriage being broken away.
Figure 13:
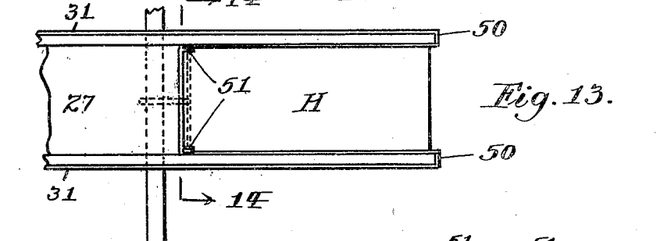
Fig. 13 is a plan of part of the structure shown in Fig. 12.
Figure 14:
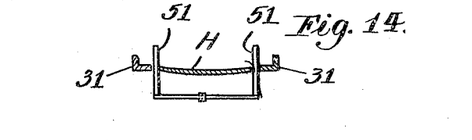
Fig. 14 is a section taken on the line 14—14 of Fig. 13.
Figure 15:
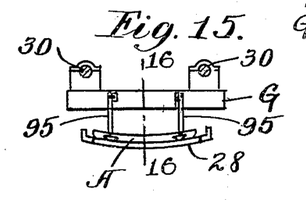
Fig. 15 is a section of a detail taken on the line 15—15 of Fig. 3, showing the hinged arms which slide loads of garment hanger blanks along the delivery table.
Figure 16:
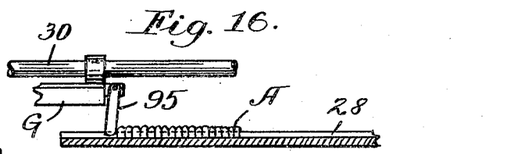
Fig. 16 is a section on the line 16—16 of Fig. 15.

A pair of co-acting longitudinal clamp members 86 and 87 is provided for holding the row of blanks tightly together in the carriage (see Fig. 11). These longitudinal clamps are actuated immediately following the functioning of the lateral clamps. The member 86 as shown is stationary upon the longitudinal members 45 and 46 of the carriage and the members 87 are slidably mounted by their ends engaging and guided by members 45 and 46 so that it may be moved to press the row of hangers against the stationary member 86. Suitable cleats 88 are secured to the movable clamp members 87 and is also guided by the lateral clamps 45 and 46. The functioning of clamps 87 is accomplished automatically by a shift rod 89 and a lever 90 which is secured rigidly to the vertical shaft 81. The shift rod 89 travels freely through a lug 91 on the clamps 87 and has a stop 92 on one side of said lug 91 and an adjustable spring 93 on the other side. Thus the forward movement of the follower 56 turns the shaft 81 and causes the clamps 87 to function under spring pressure and the reversal of the follower at the delivery end of the machine causes the clamp to release the slotted hanger blanks simultaneously with the releasing movement of the lateral clamps.

In operation garment hanger blanks are arranged in a row on the outer end portion of the receiving table 27, each individual blank being placed rim 26 down and across the table between the longitudinal guides 31. Said blanks are pressed compactly together with their ends against the movable stops 51. Next the movable stops 51 are lowered clear of the table by swinging the handle 52 down and the pack of blanks is slid inwardly by hand along the table, over the elevator G and against the inner stops 50. While being held firmly against the inner stops, the outer stops 51 are released and move back into normal position. During this operation the carriage G may make a complete forward stroke constituting a complete cycle. Upon reaching the end of the backward stroke the clutch is automatically disengaged and the carriage G assumes at rest position. When ready to start the machine the foot lever 37 is first depressed, thus raising the elevator H and load of blanks A into superior position. Next the clutch 62 is operated by hand, starting the carriage reciprocating mechanism, the first step of which is to cause the clamps 45 and 46 and 86 and 87 to engage and hold the load securely between the blank receiving members 45 and 46. An interval represented by the distance between stops 66' and 66 allows for the clamping. The carriage is next fed forwardly on the carriage guides 30, 30 by the stop 66 and the lower rim edges 26 of the row of blanks A presented to the cutting action, first of the motor driven transverse cutters and next to the cutting action of the motor driven key slotters. The carriage continues its forward movement until reaching the delivery end of the machine, whereupon the clutch is reversed and the carriage returns. After reversal the clamps are swung down automatically and the pack of blanks released onto the delivery table. Before this releasing position is attained the carriage G is reversed by the clutch, and interval represented by the distance between 66 and 66' elapsing and it returns to receive another load of blanks and repeat the cycle of operation. This interval is provided both for releasing and clamping. While the carriage moves forward the hinged ejecting elements 95 (see Figs. 15 and 16) engage the blanks previously placed on the delivery table and slide them outwardly. During return movement said ejectors sweep over the pack of blanks previously deposited on the delivery table by the carriage. In this manner the blanks are ejected from the machine automatically.

Figures 1, 2, 17, 18, 20:
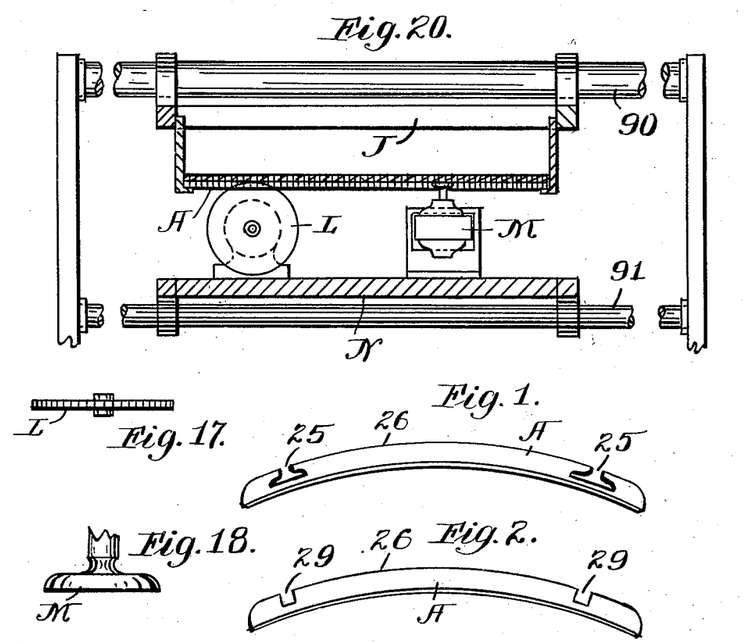
Fig. 1 is a perspective view of a garment hanger provided with slots in its opposite ends, of the kind my invention is adapted to produce.
Fig. 2 is another perspective view of a coat hanger blank having the slots partly cut.
Fig. 17 is a plan of the kerf cutting tool.
Fig. 18 is another plan of the key slot cutting tool.
Fig. 20 is a longitudinal section taken on the line 20—20 of Fig. 19.
Figure 3:
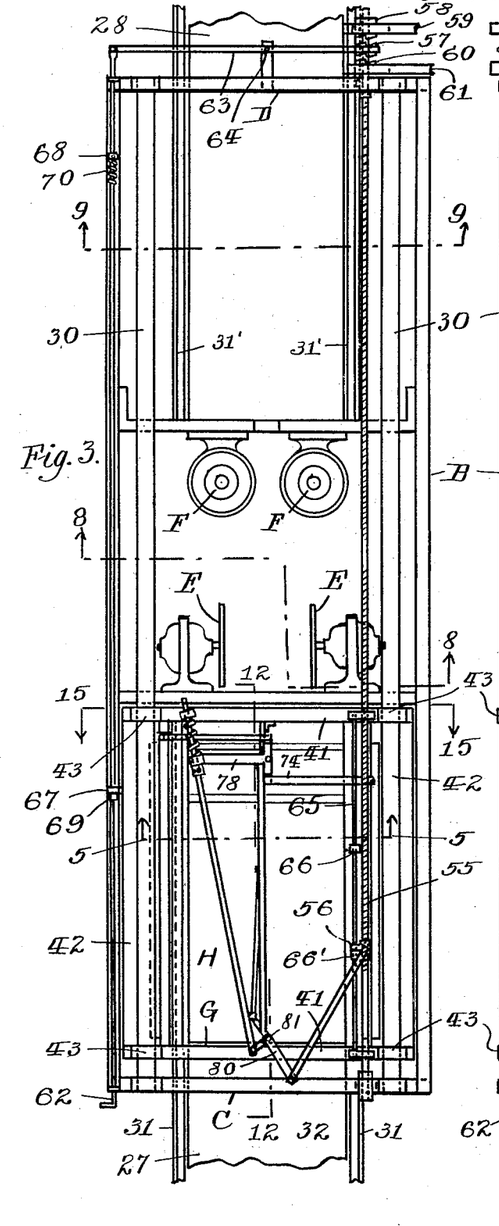
Fig. 3 is a plan of my improved garment hanger slotting machine.
Figure 4:
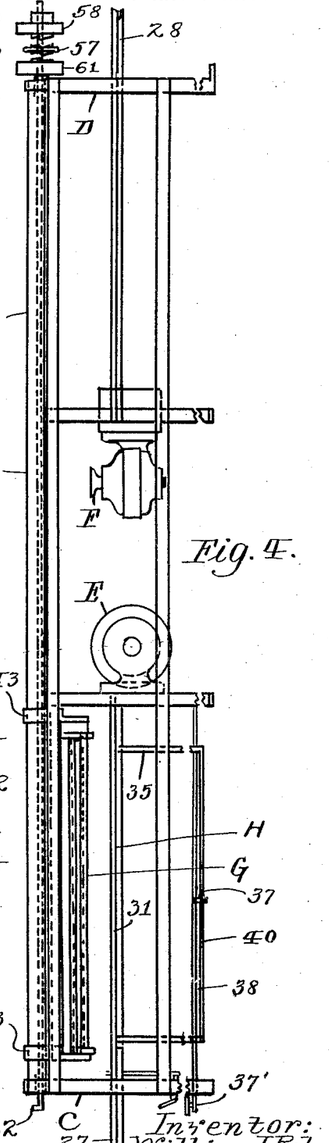
Fig. 4 is a side elevation of the machine shown in Fig. 3, parts of the structure being broken away.
Figure 19:
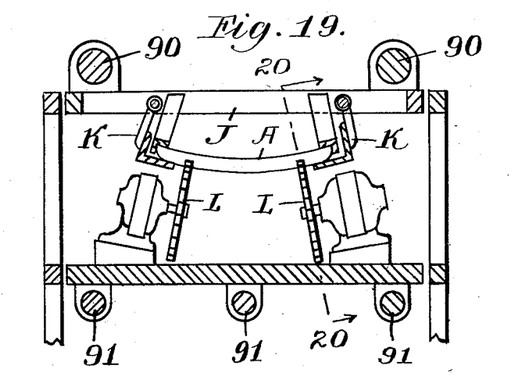
Fig. 19 is a section showing an alternative construction by which the key slots can be cut in the garment hanger blanks while the latter are held stationary instead of being moved into co-action with the cutting tools.

In the alternative construction shown in Figs. 19 and 20, the means for holding the garment hanger blanks so that they can be slotted by the cutters, consists of a movable carriage J, carrying the clamps K, and the means for slotting consisting of the pairs of motor driven cutters L and M, mounted upon the movable carriage N, said carriage J being slidable upon suitably supported guides 90 and the carriage N being slidable upon suitably supported guides 91. By this construction it will be understood that the cutters or garment hangers can be moved to accomplish the function of slotting instead of holding the cutting elements in stationary position as above described.

Changes in construction are therefore contemplated within the spirit of my invention and of the claims following:

I claim:

1. A machine of the class set forth, comprising, in combination, a frame, a plurality of power driven cutters on said frame, arranged to cut notches across the opposite ends of the convex rims of a row of blanks, an individual motor for each cutter on said frame, a carriage for holding said row of blanks, said carriage being slidable upon said frame to present said row of blanks with their convex rims to the cutting action of said cutters, means for clamping said row of blanks on said carriage during the cutting action, and means for releasing said clamping means after the cutting action.

2. A machine of the class set forth, comprising, in combination, a frame, a plurality of power driven cutters on said frame arranged to cut slots across the opposite ends of the convex rims of a row of blanks, an individual motor for actuating each cutter on said frame, a carriage adapted to hold said row of blanks and movably supported by said frame to present the convex rims of said blanks to the cutting action of said cutters, means for clamping said blanks on said carriage, means for presenting said row of hangers into engagement with said clamping means on said carriage, and means for releasing said clamping means to deliver the blanks from the carriage after said cutting action.

3. A machine of the class set forth, comprising, in combination, a frame, cutting means on said frame arranged to cut slots in the opposite ends of the convex rims of a row of blanks, a carriage adapted to hold said row of blanks and movably supported by said frame to present the convex surfaces of said blanks to the cutting action of said cutting means, means for clamping said blanks on the carriage, means for presenting said row of blanks into engagement with said clamping means on said carriage, and means for releasing said clamping means to deliver the blanks from the carriage after said cutting action, said cutting means consisting of a pair of cutters arranged so as the carriage moves forwardly to cut a pair of transverse slots across the end portions of the convex rims of said blanks, each slot being arranged with its sides at substantially right angles to a tangent to said convex rim, and a pair of cutters arranged to subsequently undercut the inner ends of the sides of said slots as the carriage progresses.

4. A machine of the class set forth, comprising, in combination, a frame, a plurality of individual motor driven cutting elements on said frame, part of the cutting elements being arranged to cut slots across the opposite ends of the convex rims of a row of garment hanger blanks, each slot being arranged with its sides at substantially right angles to a tangent to said convex rims and the remainder of said cutting elements being arranged to subsequently undercut the inner ends of the sides of said slots as the carriage progresses, a carriage adapted to hold said row of blanks and movably supported by said frame to present said blanks to the cutting action of said cutting elements, means for clamping said blanks on the carriage, means for reciprocating said carriage forwardly and backwardly on said frame to present said blanks to the cutting action of said cutting elements, means for presenting said blanks into position to be engaged by said clamping means on said carriage, means operated automatically by the action of said reciprocating means near the beginning of the first half of the stroke of said carriage for causing said clamping means to subsequently hold said blanks on said carriage, and means also actuated by said reciprocating means for releasing said clamping means near the end of the first half of the stroke of the carriage.

5. A machine of the class set forth, comprising, in combination, a frame, a rotary cutter arranged to cut a slot across a convex rim of a blank with its sides at substantially right angles to a tangent to said rim, a second rotary cutter arranged to undercut the inner end of a side of said slot following the cutting of said slot, a carriage for holding said blank movable upon said frame from blank receiving position to present the convex surface of said blank to the cutting action of said cutter, means for holding said blank on said carriage during the cutting action, and means for automatically releasing said blank from said carriage after said cutting action and for automatically returning said carriage into receiving position for another blank.

6. A machine of the class set forth, comprising, in combination, a frame, a rotary cutter arranged to cut a slot across the convex rims of blanks with their sides at substantially right angles to a tangent to said rims, a second rotary cutter arranged to undercut the inner ends of the sides of said slot following the cutting of said slot, a carriage movable from blank receiving position over said cutters to present the convex rims of the blanks to the cutting action of said cutters, an elevator below said carriage when the latter is in blank receiving position, means for assembling said blanks over said elevator with their convex rims downward, said elevator being adapted to lift the blanks from the assembling means into a position with their convex rims downward to be received by said carriage, means for clamping said blanks with their convex rims downward on said carriage, and means for actuating said clamping means to release said blanks from the carriage after said cutting action.

In witness whereof I have signed my name to this specification.

WILLIAM J. REHRIG.